(12) United States Patent
Friedel et al.

(10) Patent No.: US 12,606,237 B2
(45) Date of Patent: Apr. 21, 2026

(54) METHOD FOR REDUCING LOADS IN A STEERING SYSTEM

(71) Applicant: Robert Bosch GmbH, Stuttgart (DE)

(72) Inventors: Michael Friedel, Ruppertshofen (DE); Michael Ochs, Bartholomae (DE); Martin Zimmermann, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 620 days.

(21) Appl. No.: 18/002,959

(22) PCT Filed: May 20, 2021

(86) PCT No.: PCT/EP2021/063440
§ 371 (c)(1),
(2) Date: Dec. 22, 2022

(87) PCT Pub. No.: WO2022/012802
PCT Pub. Date: Jan. 20, 2022

(65) Prior Publication Data
US 2023/0339535 A1 Oct. 26, 2023

(30) Foreign Application Priority Data

Jul. 14, 2020 (DE) ..................... 10 2020 208 767.9

(51) Int. Cl.
B62D 5/04 (2006.01)
B62D 6/00 (2006.01)
(52) U.S. Cl.
CPC ........... B62D 5/0472 (2013.01); B62D 6/008 (2013.01)
(58) Field of Classification Search
CPC .............................. B62D 5/0472; B62D 6/008

USPC ........................................................ 180/446
See application file for complete search history.

(56) References Cited

U.S. PATENT DOCUMENTS

2009/0250289 A1* 10/2009 Kifuku ................. B62D 5/0487
180/446

FOREIGN PATENT DOCUMENTS

| CN | 1618677 A | * | 5/2005 | ........... B62D 5/0472 |
|----|-----------|---|--------|-------------------------|
| DE | 10 2007 011 509 A1 | | 12/2007 | |
| DE | 10 2008 056 472 A1 | | 11/2009 | |
| DE | 10 2009 002 706 A1 | | 11/2010 | |
| JP | H5-238409 A | | 9/1993 | |
| JP | H9-221051 A | | 8/1997 | |
| JP | 2003-137126 A | | 5/2003 | |
| JP | 2010-120577 A | | 6/2010 | |
| JP | 2011-31713 A | | 2/2011 | |

(Continued)

OTHER PUBLICATIONS

International Search Report corresponding to PCT Application No. PCT/EP2021/063440, mailed Aug. 11, 2021 (German and English language document) (5 pages).

*Primary Examiner* — Jacob D Knutson
(74) *Attorney, Agent, or Firm* — Maginot, Moore & Beck LLP

(57) ABSTRACT

The disclosure relates to a method for reducing loads in a steering system in particular during an operation in a vehicle, wherein a load caused by an external application of force on the steering system is determined and at least partially compensated in at least one operating state by controlling an actuator unit, and wherein the actuator unit is controlled in the operating state in such a way that an inertia effect of the steering system correlating with the external application of force is reduced.

14 Claims, 2 Drawing Sheets

(56)         References Cited

FOREIGN PATENT DOCUMENTS

JP          2011031713  A   *   2/2011   ........... B62D 5/0481
JP          2018-183046  A      11/2018

* cited by examiner

METHOD FOR REDUCING LOADS IN A STEERING SYSTEM

This application is a 35 U.S.C. § 371 National Stage Application of PCT/EP2021/063440, filed on May 20, 2021, which claims the benefit of priority to Serial No. DE 10 2020 208 767.9, filed on Jul. 14, 2020 in Germany, the disclosures of which are incorporated herein by reference in their entirety.

BACKGROUND

The disclosure relates to a method for reducing loads in a steering system. The disclosure also relates to a control unit comprising a computing unit for carrying out such a method and to a vehicle comprising a computing unit for carrying out such a method.

In order to remain functional over their entire lifetime, vehicles, and in particular their steering systems, have to be designed in such a way that they have a high load capacity. Very high loads act on the steering system, in particular when driving on rough roads, wherein the loads depend in particular on the size and arrangement of the masses and inertias in the steering system and the stiffness of the steering system. Therefore, to prevent damage, mechanically oversized components are typically used, but this increases the weight of the steering system and increases costs.

The object of the disclosure is in particular to provide a method for reducing loads in a steering system with improved properties in terms of efficiency. The object is achieved by the features of the disclosure, while advantageous configurations and further developments of the disclosure can be found in the disclosure subclaims.

SUMMARY

A method for reducing loads in a steering system, in particular during an operation in a vehicle and advantageously in a motor vehicle, is proposed, wherein a load, in particular a mechanical load, in particular of the steering system, caused by an external application of force to the steering system is determined and at least partially and preferably at least largely compensated in at least one operating state by controlling an actuator unit, and wherein the actuator unit is controlled in the operating state, in particular for at least partial compensation of the load, in such a way that an inertia effect of the steering system correlating with the external application of force is reduced. The load, which is caused in particular by the external application of force to the steering system, advantageously comprises an application of force from a surface under and/or an environment of the vehicle. The external application of force, which in particular leads to the load on the steering system, can, for instance, be caused by an uneven road surface, by a pothole, by driving over an obstacle, by driving on a rough road and/or by other such unusual events. The external application of force advantageously differs from a steering movement and/or a direct application of force to a steering handle of the steering system, in particular by a driver. In the operating state, controlling the actuator unit can furthermore in particular also at least partially compensate a load on components that are operatively connected to the steering system, such as a tie rod and/or a chassis, as a result of which loads on an entire vehicle axle, in particular a front axle, can advantageously be compensated. This configuration in particular makes it possible to improve efficiency, in particular weight efficiency, component efficiency and/or cost efficiency. A fatigue strength and/or a service life of the vehicle, and in particular the steering system, can advantageously be increased as well.

An "actuator unit" should in particular be understood to be an at least partially electrically and/or electronically configured unit that is designed to provide a torque and/or a force and to transmit it to at least one steering component. For this purpose, the actuator unit preferably comprises at least one electric motor, in particular one that is operatively connected to the steering component. The actuator unit is preferably also part of the steering system. "An inertia effect of the steering system correlating with the external application of force is reduced" should furthermore in particular be understood to mean that an inertia of the steering system resulting from the external application of force is reduced and/or a resistance of the steering system to the external application of force is reduced.

The vehicle and/or the steering system can moreover in particular comprise at least one computing unit, wherein the computing unit is in particular provided to carry out the method for reducing the loads in the steering system. A "computing unit" should in particular be understood to mean an electrical and/or electronic unit which comprises an information input, information processing and an information output. The computing unit advantageously further comprises at least one processor, at least one operating memory, at least one input and/or output means, at least one operating program, at least one control routine, at least one calculation routine, at least one monitoring routine and/or at least one evaluation routine. The computing unit is in particular at least provided for determining a load caused by an external application of force to the steering system. The computing unit is moreover in particular provided for controlling the actuator unit. In the present case, the computing unit is in particular also provided for controlling the actuator unit in at least one operating state such that an inertia effect of the steering system correlating with the external application of force is reduced and the load caused by the external application of force to the steering system is at least partially, and preferably at least largely, compensated. The computing unit is preferably integrated into a control unit of the vehicle and/or the steering system. The term "at least largely" should in particular be understood to mean at least 55%, advantageously at least 75%, and particularly advantageously at least 95%. "Provided" should in particular be understood to mean specially programmed, designed and/or equipped. An object being provided for a specific function should in particular be understood to mean that the object fulfills and/or carries out this particular function in at least one application and/or operating state.

Advantageously, it is proposed that a compensation torque counteracting the inertia of the steering system and/or a compensation force counteracting the inertia of the steering system is produced in the operating state by means of the actuator unit and is applied to the steering system, in particular for at least partial compensation of the load. The compensation torque produced in particular by means of the actuator unit and/or the compensation force produced in particular by means of the actuator unit is in particular oriented in the same direction as the external application of force, so that the steering system advantageously moves with the external application of force and in particular in the direction of the external application of force and/or a resistance of the steering system to the external application of force is reduced. The compensation torque produced in particular by means of the actuator unit and/or the compensation force produced in particular by means of the actuator unit is particularly advantageously also introduced into a steering shaft of the steering system and/or a steering gear of the steering system. Inertia effects of the steering system and therefore loads on the steering system can thus be reduced in a particularly advantageous simple manner.

It is also proposed that a load reduction function be used in the operating state to control the actuator unit, wherein the load reduction function is activated and/or deactivated in a driving situation-specific manner, in particular as a function of a current driving situation. The load reduction function is in particular a software algorithm, which is preferably stored in the operating memory of the computing unit. The computing unit is in particular provided to control the actuator unit in the operating state by means of the load reduction function in such a way that a compensation torque counteracting the inertia of the steering system and/or a compensation force counteracting the inertia of the steering system is produced by means of the actuator unit. A load characteristic is advantageously determined for activating and/or deactivating the load reduction function, and in particular compared to at least one limit value. In this context, a "load characteristic" should in particular be understood to mean a characteristic that is at least correlated with an, in particular mechanical, load on the steering system caused by an external application of force to the steering system. It is in particular possible to at least use the load characteristic to infer an, in particular mechanical, load and/or stress on the steering system and/or at least one steering component and/or determine an, in particular mechanical, load and/or stress on the steering system and/or the at least one steering component. The load characteristic is advantageously also correlated with a current driving situation. Consequently, it is preferably possible to at least use the load characteristic to infer a current driving situation and/or determine a current driving situation. The load characteristic is preferably also determined continuously or monitored throughout a monitoring time interval, and a change in the load characteristic over time is evaluated to determine the load and/or the current driving situation. This in particular makes it possible to react to loads in the steering system in a situation-specific manner. It can in particular be ensured that, in normal driving situations, in which the loads in the steering system are below a limit value, there are no perceptible changes in the behavior and/or feel of the steering.

It is further proposed that a load characteristic correlated with the load, in particular the aforementioned load characteristic, be determined, wherein the load reduction function is activated if the load characteristic exceeds an, in particular defined and/or definable, first limit value and is deactivated if the load characteristic exceeds an, in particular defined and/or definable, second limit value. The first limit value and the second limit value can in particular be different, wherein the second limit value is advantageously below the first limit value. This in particular makes it possible to realize an advantageous hysteresis behavior. It can also advantageously be ensured that the load reduction function remains activated even when the loads fluctuate. The first limit value and the second limit value can alternatively also be identical, however, as a result of which in particular a defined reaction to external loads can be achieved.

A particularly unobtrusive activation and/or deactivation of the load reduction function can in particular be achieved if the load reduction function, and in particular the compensation torque and/or the compensation force, is displayed when activated and/or hidden when deactivated. The activation and/or deactivation of the load reduction function preferably takes place gradually or successively and in particular not abruptly. The activation and/or deactivation of the load reduction function is particularly preferably carried out by means of a continuous function which can preferably be differentiated at each point, in particular an asymptotic function, a sigmoid function, or advantageously a ramp function.

In a particularly preferred embodiment, it is proposed that at least one load prevailing in a servo train be compensated at least partially and preferably at least largely in the operating state by controlling the actuator unit. The servo train is in particular defined by a steering gear of the steering system. This can advantageously in particular reduce loads in a servo train of the steering system.

Alternatively or additionally, it is proposed that at least one load prevailing in a steering train be compensated at least partially and preferably at least largely in the operating state by controlling the actuator unit. The steering train is in particular defined by a steering shaft of the steering system. This can advantageously in particular reduce loads in a steering train of the steering system.

Particularly preferably, a load prevailing in the servo train and a load prevailing in the steering train are compensated, wherein the total load corresponds in particular to a total rack force. This can advantageously in particular reduce loads in the entire steering system.

The actuator unit could be configured as an additional actuator, for example, and be provided solely to reduce loads in the steering system. In particular if the steering system is a steer-by-wire steering system, a feedback actuator could moreover also be used as the actuator unit to provide a restoring torque to a steering handle. However, a particularly simple and/or cost-efficient design can in particular be achieved if an electric steering actuator is used as the actuator unit for providing a steering torque. In this context, a "steering actuator" should in particular be understood to mean an actuator unit which is designed to provide a steering torque and thereby advantageously influence a direction of travel of the vehicle. The steering actuator is preferably designed to provide a steering torque to support a manual torque applied by the driver to a steering handle and/or a steering torque for automatic and/or autonomous control of a direction of travel of the vehicle. The steering actuator could in particular be disposed in the region of a steering train and in particular be coupled to a steering shaft of the steering system. Advantageously, however, the steering actuator is disposed in the region of a servo train and is in particular coupled to a steering gear of the steering system.

It is further proposed that at least one operating variable of the actuator unit and/or a movement of a steering handle of the steering system be monitored and in particular evaluated to determine the load caused in particular by the external application of force to the steering system. The operating variable is preferably an acceleration of the actuator unit, in particular caused by the external application of force, and/or an operating variable correlated with the acceleration; for example an operating voltage and/or an operating current of the actuator unit. Preferably, at least one movement sensor is furthermore used to monitor the movement of the steering handle and is in particular provided to detect a movement signal correlated with the movement of the steering handle. In addition, at least one inertia and advantageously a moment of inertia of the actuator unit and/or of the steering handle and/or of a peripheral assembly of the steering handle, in particular with a dominant inertia, can advantageously be taken into account for determining the load caused in particular by the external application of force to the steering system. This in particular makes it possible to achieve a particularly flexible and/or exact determination of the load.

The method for reducing the loads in the steering system is not intended to be limited to the above-described application and embodiment. In order to carry out a function described here, the method for reducing the loads in the steering system can in particular comprise a number of individual elements, components and units that differs from a number specified here.

BRIEF DESCRIPTION OF THE DRAWINGS

Further advantages will become apparent from the following description of the drawing. The drawings show an embodiment example of the disclosure.

The Figures Show.

DETAILED DESCRIPTION

Figures 1A, 1B:
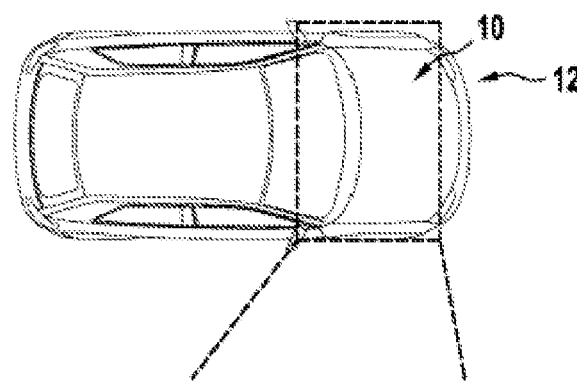
FIG. 1a-b an example of a vehicle comprising a steering system in a simplified illustration.

FIGS. 1a and 1b show a simplified illustration of a vehicle 12, which, as an example, is configured as a passenger vehicle comprising a plurality of vehicle wheels 28 and comprising a steering system 10. The steering system 10 is operatively connected to the vehicle wheels 28, which in the present case are in particular configured as front wheels, and is provided for influencing a direction of travel of the vehicle 12. The steering system 10 in the present case is moreover configured as an electrically assisted steering system and accordingly comprises electric power assistance in the form of a servo steering system. In principle, however, it is also conceivable to configure a steering system as a hydraulically assisted steering system, in particular comprising hydraulic power assistance. A steering system could furthermore in principle also be configured as a steer-by-wire steering system.

The steering system 10 comprises a steering handle 22, configured for example in the present case as a steering wheel, for a manual torque applied by the driver, a steering gearbox 30, which is configured for example as a rack-and-pinion steering gear, comprises a steering actuating element 32 and is provided for converting a steering input at the steering handle 22 into a steering movement of the vehicle wheels 28, and a steering shaft 34 for, in particular mechanically, connecting the steering handle 22 to the steering gear 30. The steering gear 30 defines a servo train 18 of the steering system 10. The steering shaft 34 defines a steering train 20 of the steering system 10. A steering handle could alternatively also be configured as a steering lever or a steering ball or the like. It is furthermore also conceivable to completely forgo a steering handle. A steering shaft could moreover also connect a steering handle to a steering gear only intermittently and/or have a mechanical separation, such as in a steer-by-wire steering system.

The steering system 10 also comprises an actuator unit 14. The actuator unit 14 is at least partially configured electrically and/or electronically. The actuator unit 14 in the present case is configured as a steering actuator. The actuator unit 14 is operatively connected to the steering gear 30. The actuator unit 14 is coupled to the steering gear 30, and in particular to the steering actuating element 32. The actuator unit 14 is designed to provide a steering torque to support a manual torque applied by the driver to the steering handle 22 and to transmit it to the steering actuating element 32. For this purpose, the actuator unit 14 comprises at least one electric motor. The electric motor in the present case is in particular configured as a permanently excited synchronous motor and is provided for producing the steering torque. In principle, however, an actuator unit could also comprise a plurality of electric motors. An actuator unit could furthermore also be configured as a feedback actuator or as an additional actuator that differs from a steering actuator and feedback actuator. An actuator unit could moreover also comprise multiple actuators, for example a steering actuator and a feedback actuator.

The steering system 10 also comprises at least one steering sensor 36 which is disposed on the steering shaft 34 and is known per se. The steering sensor 36 is configured as a torque sensor. The steering sensor 36 is provided to acquire steering information correlated with an actuation of the steering handle 22, in particular a driver's manual torque and/or torque applied to the steering handle 22. In the present case, the steering sensor 36 is provided for acquiring a torsion bar signal. A steering sensor could alternatively also be configured as a sensor other than a torque sensor, for example as a rotation angle sensor and/or as a combined torque and rotation angle sensor. A steering sensor could furthermore also be omitted.

The steering system 10 also comprises at least one operating sensor 38 associated with the actuator unit 14. The operating sensor 38 is configured as a rotor position sensor and is provided to acquire at least one operating variable of the actuator unit 14, in the present case in particular a rotor position signal of the electric motor. Alternatively or additionally, however, an operating sensor could also be configured as a sensor other than a rotor position sensor, for example as an acceleration sensor, a structure-borne noise sensor, a voltage sensor, a current sensor and/or a temperature sensor. In principle, however, an operating sensor could also be omitted.

The steering system 10 also comprises at least one movement sensor 40. The movement sensor 40 differs from the steering sensor 36 and operating sensor 38. The movement sensor 40 is configured as a speed sensor. The movement sensor 40 is configured as a steering wheel sensor and is disposed in the region of the steering handle 22. The movement sensor 40 is provided to acquire a movement signal correlated with the movement of the steering handle 22, in the present case in particular a speed signal. Alternatively, however, a movement sensor could also be configured as a sensor other than a speed sensor, for example as a position sensor, a distance sensor, an acceleration sensor and/or a structure-borne noise sensor, and in particular be provided to acquire a movement signal other than a speed signal. A movement sensor could moreover in principle also be disposed in the region of a steering shaft, advantageously above an intermediate steering shaft. A movement sensor could furthermore also be omitted.

The vehicle 12 also comprises a control unit 24. As an example, the control unit 24 is configured as a steering control unit and is therefore part of steering system 10. The control unit 24 has an electrical connection to the actuator unit 14. The control unit 24 also has an electrical connection to the steering sensor 36, the operating sensor 38 and the movement sensor 40. The control unit 24 is provided to receive the torsion bar signal from the steering sensor 36, the operating variable from the operating sensor 38 and the movement signal from the movement sensor 40. The control unit 24 is also provided for controlling the actuator unit 14.

For this purpose, the control unit 24 comprises a computing unit 26. The computing unit 26 comprises at least one processor (not shown), for example in the form of a microprocessor, and at least one operating memory (not shown). The computing unit 26 also comprises at least one operating program which is stored in the operating memory and includes at least one control routine, at least one calculation routine, at least one monitoring routine and at least one evaluation routine. In principle, however, it is also conceivable to configure a control unit separately from a steering system. In this case, a vehicle could, for instance, have a single central control unit with a central computing unit.

Very high loads act on the steering system 10, in particular when driving on rough roads, wherein the loads depend in particular on the size and arrangement of the masses and inertias in the steering system 10 and the stiffness of the steering system and in particular the stiffness of the servo train 18 and the steering train 20. The loads result substantially from the steering system 10 being braced against a surface under the vehicle or a roadway.

To reduce the loads on the steering system 10, a corresponding method is therefore proposed, wherein the computing unit 26 in the present case is provided for carrying out the method and for this purpose in particular comprises a computer program with corresponding program code means.

In this case, a load on the steering system 10 caused by an external application of force to the steering system 10 is determined and compensated in at least one operating state by controlling the actuator unit 14. The load comprises an application of force from a surface under and/or an environment of the vehicle 12 and can result from an uneven road surface, for instance, and/or from driving on a rough road.

To compensate the load, the actuator unit 14 is controlled in the operating state such that an inertia effect of the steering system 10 correlating with the external application of force is reduced. For this purpose, a compensation torque counteracting the inertia of the steering system 10 and oriented in the same direction as the external application of force is produced by means of the actuator unit 14 and applied to the steering system 10, so that the steering system 10 moves with the external application of force and in particular in the direction of the external application of force and a resistance of the steering system 10 to the external application of force is reduced. Thus, in the present case, an influence of an inertia of the steering system 10 is minimized, as a result of which loads on the corresponding neuralgic locations of the steering system 10 can be reduced.

For controlling the actuator unit 14, the computing unit 26 comprises a load reduction function 16, which is in particular stored in the operating memory of the computing unit 26 and is used in the operating state. The actuator unit 14 is controlled by means of the load reduction function 16 in such a way that the compensation torque is produced. The load reduction function 16 is moreover activated and deactivated in a driving situation-specific manner, in particular as a function of a current driving situation. In a normal driving situation, in which the loads in the steering system 10 are low, the load reduction function 16 is deactivated, as a result of which no changes in the behavior and/or feel of the steering can be perceived by a driver. On the other hand, in a load situation, for example when driving on a rough road, the load reduction function 16 is activated to reduce the loads on the steering system 10. The load reduction function 16 is therefore advantageously not permanently active and is switched on only as needed.

A load characteristic correlated with the load caused by the external application of force to the steering system 10 and/or the current driving situation is determined for activating and deactivating the load reduction function 16. The load characteristic is determined continuously or is monitored throughout a monitoring time interval. The load reduction function 16 is moreover activated if the load characteristic exceeds a first limit value and is deactivated if the load characteristic falls below a second limit value that differs from the first limit value, which in particular makes it possible to realize a corresponding hysteresis behavior.

The load reduction function 16, and in the present case in particular the compensation torque, can also be displayed when activated and hidden when deactivated, which in particular makes it possible to achieve an unobtrusive activation and/or deactivation. Advantageously, a ramp function is used for this purpose. However, displaying and/or hiding could alternatively also be carried out using a function other than a ramp function, for example an asymptotic function. Forgoing displaying and/or hiding would be possible as well.

In principle, the load is at least substantially composed of two main components, namely the loads in the steering gear 30 and/or the servo train 18, and the loads in the steering shaft 34 and/or the steering train 20.

According to a first embodiment, it is therefore conceivable to reduce only the loads in the servo train 18. In that case, the actuator unit 14 is controlled in the operating state in such a way that a load prevailing in the servo train 18 is compensated.

The load in the servo train 18 can be determined using the following relationship:

$$M_S = M_{S,G} + M_{S,M} = J_S \cdot \ddot{a}_s + M_{S,M} \tag{1}$$

$M_s$ describes a total torque on a motor shaft of the electric motor of the actuator unit 14 which characterizes the load in the servo train 18 and consists of a first or generative component $M_{s,G}$, i.e., an acceleration of the servo train 18, and a second and/or motoric component $M_{s,m}$, i.e., a motor torque acting on the motor shaft of the electric motor of the actuator unit 14, while is characterizes the inertia of the actuator unit 14 and $\ddot{a}_s$ characterizes the acceleration, in particular the rotor acceleration, of the actuator unit 14.

In this case, therefore, at least one operating variable of the actuator unit 14, in the present case in particular an acceleration of the actuator unit 14, is monitored and evaluated to determine the load, in particular in the form of the generative component $M_{s,G}$. In addition, at least one inertia of the actuator unit 14 is taken into account to determine the load. The motoric component $M_{S,M}$ can also be determined using another operating variable of the actuator unit 14, in the present case in particular an operating current and/or phase current of the electric motor. It is also conceivable to take into account at least a fundamental inertia of a further steering component for determining the load in the servo train 18.

In this case, the following applies to the compensation torque $M_{K1}$:

$$M_{K1} = -M_S \tag{2}$$

Alternatively, however, it is in principle also conceivable to compensate only a load resulting from the generative component $M_{S,G}$ or a load resulting from the motoric component $M_{S,M}$ by controlling the actuator unit 14, as a result of which the load in the steering system 10 and in particular in the servo train 18 can at least be reduced.

According to a second embodiment, it is conceivable to reduce only the loads in the steering train 20. In that case, the actuator unit 14 is controlled in the operating state in such a way that a load prevailing in the steering train 20 is compensated.

The load in the steering train 20 can be determined using the following relationship:

$$M_L = M_{L,G} + M_{L,F} = I_L \cdot \ddot{a}_L + M_{L,F} \qquad (3)$$

$M_L$ describes a total torque in the region of the steering handle 22 which characterizes the load in the steering train 20, and consists of a further generative component $M_L, G$ and a driver's manual torque $M_{L,F}$, while $I_L$ characterizes the inertia of the steering handle 22 and $\ddot{a}_L$ characterizes the acceleration of the steering handle 22, in particular in the form of an angular acceleration.

In this case, at least one movement of the steering handle 22 detected by the movement sensor 40 is monitored and evaluated to determine the load, in particular in the form of the further generative component $M_{L,G}$. For this purpose, the movement sensor 40 acquires a movement signal correlated with a movement speed of the steering handle 22 and different from an acceleration signal, from which an acceleration signal correlated with the movement of the steering handle 22 is then calculated. The calculation of the acceleration signal is advantageously carried out by means of a gradient formation and in particular using a difference quotient. Alternatively, however, another type of differential calculation could be used, or an acceleration signal correlated with a movement of a steering handle could be acquired directly. In addition, at least one inertia of the steering handle 22 is taken into account to determine the load. The driver's manual torque $M_{L,F}$ can furthermore be determined using the torsion bar signal from the steering sensor 36 and/or using the movement signal from the movement sensor 40. It is also conceivable to take into account at least a fundamental inertia of a further steering component for determining the load in the steering train 20.

In this case, the following applies to the compensation torque $M_{K2}$:

$$M_{K2} = -M_L \cdot i \cdot \eta \qquad (4)$$

i describes a transmission ratio of the actuator unit 14, while η defines a corresponding efficiency.

Alternatively, however, it is in principle also conceivable to compensate only a load resulting from the further generative component $M_{L,G}$ or a load resulting from the driver's manual torque $M_{L,F}$ by controlling the actuator unit 14, as a result of which the load in the steering system 10 and in particular in the steering train 20 can at least be reduced.

According to a third embodiment, it is further conceivable to reduce the loads in the servo train 18 and the loads in the steering train 20. In that case, the actuator unit 14 is controlled in the operating state in such a way that a load prevailing in the servo train 18 and a load prevailing in the steering train 20 is compensated.

In this case, the total load, which in particular corresponds to a total rack force, is obtained using the following relationship:

$$m = m_s \cdot i_s \cdot \eta_s + M_L \cdot i_L \cdot \eta_L \qquad (5)$$

M describes the total load, while $i_s$ and $i_L$ are corresponding transmission ratios in the servo train 18 and in the steering train 20 and $\eta_s$ and $\eta_L$ are corresponding efficiencies in the servo train 18 and in the steering train 20.

In this case, the following applies to the total compensation torque $M_K$:

$$M_K = -M \cdot i \cdot \eta \qquad (6)$$

i describes a transmission ratio of the actuator unit 14, while η defines a corresponding efficiency.

Figure 2:
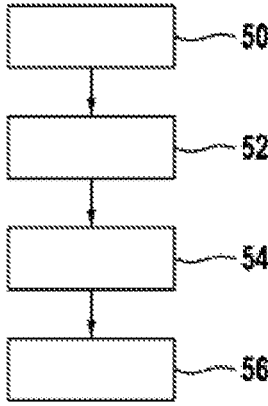
FIG. 2 an example of a flowchart comprising the main method steps of a method for reducing loads in the steering system.

FIG. 2 lastly shows an example of a flowchart with the main method steps of the method for reducing the loads in the steering system 10.

In a method step 50, a load on the steering system 10 caused by an external application of force to the steering system 10 is determined. For this purpose, at least one operating variable of the actuator unit 14 and/or a movement of the steering handle 22 is monitored and evaluated. The load can be a load prevailing in the servo train 18 and/or a load prevailing in the steering train 20. A load characteristic correlated with the load caused by the external application of force to the steering system 10 and/or the current driving situation is continuously determined and compared with the first limit value. If the load characteristic exceeds the first limit value, a method step 52 follows.

In method step 52, the load reduction function 16 is activated, whereby the load reduction function 16 is preferably displayed.

In a method step 54, the actuator unit 14 is controlled using the load reduction function 16 in such a way that a compensation torque counteracting the inertia of the steering system 10 and oriented in the same direction as the external application of force is produced. The compensation torque is applied to the steering system 10, so that the steering system 10 moves with the external application of force and in particular in the direction of the external application of force and a resistance of the steering system 10 to the external application of force is reduced. An inertia effect of the steering system 10 correlating with the external application of force can thus be reduced and the load in the steering system 10 can be at least partially compensated. The load characteristic furthermore continues to be determined and compared to the second limit value. If the load characteristic falls below the second limit value, a method step 56 follows.

In method step 56, the load reduction function 16 is deactivated, whereby the load reduction function 16 is preferably hidden.

The example of a flowchart in FIG. 2 is in particular intended to describe a method for reducing loads in the steering system 10 merely as an example of. Individual method steps can in particular also vary or additional method steps can be added.

The invention claimed is:

1. A method of reducing loads in a steering system during an operation in a vehicle, comprising:
   determining a load caused by an external application of force to the steering system, the force configured to move the steering system in a force direction; and
   at least partially compensating for the load in at least one operating state by controlling an actuator unit to reduce an inertia effect of the steering system by moving the steering system in the force direction using the actuator unit.

2. The method according to claim 1, wherein at least partially compensating for the load comprises:
   producing at least one of (i) a compensation torque counteracting the inertia effect of the steering system using the actuator unit, and (ii) a compensation force counteracting the inertia effect of the steering system in the at least one operating state using the actuator unit; and
   applying the compensation torque and/or the compensation force to the steering system.

3. The method according to claim 1, wherein:

a load reduction function is used in the at least one operating state to control the actuator unit, and the load reduction function is activated and/or deactivated in a driving situation-specific manner.

4. The method according to claim 3 wherein:

a load characteristic correlated with the load is determined;

the load reduction function is activated in response to the load characteristic exceeding a first limit value; and the load reduction function is deactivated in response to the load characteristic falling below a second limit value.

5. The method according to claim 4, wherein at least one of the load reduction function is displayed when activated, and the load reduction function is hidden when deactivated.

6. The method according to claim 1, wherein the load includes at least one load prevailing in a servo train.

7. The method according to claim 1, wherein the load includes at least one load prevailing in a steering train.

8. The method according to claim 1, wherein at least partially compensating for the load comprises:

using an electric steering actuator as the actuator unit to provide a compensation torque.

9. The method according to claim 8, wherein:

the force to the steering system results in an applied torque, and the compensation torque is in a same direction as the applied torque.

10. The method according to claim 1, wherein determining the load comprises:

monitoring at least one operating variable of the actuator unit and/or a movement of a steering handle.

11. The method according to claim 1, wherein the load comprises an application of force from a surface under the vehicle and/or an environment of the vehicle.

12. A steering control unit, comprising a computing unit configured to carry out the method according to claim 1.

13. A motor vehicle, comprising:

a steering system which comprises at least one actuator unit; and a computing unit configured to carry out the method according to claim 1.

14. The method according to claim 1, wherein moving the steering system in the force direction reduces a resistance of the steering system to the force to the steering system.

* * * * *